US012736711B2

(12) United States Patent
Li et al.

(10) Patent No.: US 12,736,711 B2
(45) Date of Patent: Sep. 15, 2026

(54) INVASION CORRECTION METHOD AND SYSTEM FOR RESISTIVITY LOGGING

(71) Applicant: Chengdu University of Technology, Chengdu (CN)

(72) Inventors: Kesai Li, Chengdu (CN); Jiaqi Sun, Chengdu (CN); Hucheng Deng, Chengdu (CN); Xianhong He, Chengdu (CN); Zehou Xiang, Chengdu (CN); Hangjie Lin, Chengdu (CN); Yanjun Liu, Chengdu (CN); Jianhua He, Chengdu (CN); Yan Liu, Chengdu (CN); Kaicheng Lei, Chengdu (CN); Shuoshuo Zhan, Chengdu (CN); Hong Li, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 1 day.

(21) Appl. No.: 18/783,323

(22) Filed: Jul. 24, 2024

(65) Prior Publication Data

US 2025/0035813 A1 Jan. 30, 2025

(30) Foreign Application Priority Data

Jul. 25, 2023 (CN) ......................... 202310915608.6

(51) Int. Cl.
*G01V 11/00* (2006.01)

(52) U.S. Cl.
CPC ................................. *G01V 11/002* (2013.01)

(58) Field of Classification Search
CPC .. E21B 2200/20; E21B 47/00; E21B 2200/22; E21B 49/00; G01V 3/03; G01V 11/002; G01V 3/38; Y02A 90/30
See application file for complete search history.

(56) References Cited

U.S. PATENT DOCUMENTS

| | | | | |
|---|---|---|---|---|
| 5,867,806 | A * | 2/1999 | Strickland ................ | G01V 3/38 702/7 |
| 10,890,066 | B1 | 1/2021 | Ibrahim et al. | |
| 2017/0364795 | A1 | 12/2017 | Anderson et al. | |
| 2020/0334577 | A1 | 10/2020 | Anderson et al. | |
| 2020/0401951 | A1 | 12/2020 | Ranganathan et al. | |
| 2021/0110280 | A1 | 4/2021 | Akkurt et al. | |

(Continued)

FOREIGN PATENT DOCUMENTS

| | | | |
|---|---|---|---|
| CN | 103628871 | A | 3/2014 |
| CN | 111980662 | A | 11/2020 |

(Continued)

*Primary Examiner* — Steven Lim

(57) ABSTRACT

Disclosed is an invasion correction method and system for resistivity logging. The method includes the steps of: analyzing mud filtrate invasion features based on an actual resistivity logging curve; determining an invasion mechanism, and performing forward modeling on a resistivity logging response; performing inversion by a random forest method to form a correction chart; and outputting a formation resistivity to finally form the invasion correction method and system for resistivity logging. In the present disclosure, double lateral correction under an invasion condition is accomplished, while a chart method and an inversion method are combined, ensuring the accuracy and operating rate of correction.

1 Claim, 10 Drawing Sheets

(56) References Cited

U.S. PATENT DOCUMENTS

| | | | | |
|---|---|---|---|---|
| 2021/0301655 | A1 | 9/2021 | Ranganathan et al. | |
| 2022/0275707 | A1 * | 9/2022 | Aljishi | E21B 49/005 |
| 2023/0084947 | A1 * | 3/2023 | Mahiout | E21B 44/00 175/24 |
| 2023/0099449 | A1 * | 3/2023 | Aljishi | E21B 47/07 702/6 |
| 2023/0235662 | A1 * | 7/2023 | Hermanrud | E21B 47/047 166/250.03 |

FOREIGN PATENT DOCUMENTS

| | | | | |
|---|---|---|---|---|
| CN | 113919219 | A | 1/2022 | |
| CN | 114575834 | A | 6/2022 | |
| CN | 112593919 | B * | 12/2022 | E21B 47/00 |
| CN | 115469366 | A | 12/2022 | |
| CN | 115659245 | A | 1/2023 | |
| CN | 116305850 | A | 6/2023 | |
| WO | 2020167334 | A1 | 8/2020 | |
| WO | 2021155086 | A1 | 8/2021 | |

* cited by examiner

INVASION CORRECTION METHOD AND SYSTEM FOR RESISTIVITY LOGGING

CROSS-REFERENCE TO RELATED APPLICATIONS

This application claims priority of Chinese Patent Application No. 202310915608.6, filed on Jul. 25, 2023, the entire contents of which are incorporated herein by reference.

TECHNICAL FIELD

The present disclosure belongs to the technical field of resistivity logging correction, and more particularly, to an invasion correction method and system for resistivity logging.

BACKGROUND

At present, for the evaluation of tight sandstone oil-gas reservoirs, it can make more accurate determination on reservoir physical property evaluation and fluid identification using an resistivity logging series, which is the indispensable data in processes of reservoir evaluation and oil-gas exploration and development. However, when a resistivity logging curve is used, the properties of formation fluid in an invaded zone are changed due to the invasion of mud filtrate. When the invaded zone is large, it will seriously affect logging response features, and it is difficult to obtain a true formation resistivity (Rt) value, affecting the accuracy of reservoir logging evaluation. In recent years, the invasion correction of formation resistivity is done by mainly using numerical simulation of resistivity dynamic response and time-lapse logging to obtain the Rt value. The existing technologies of mud filtrate invasion correction based on a geophysical logging method at home and abroad mainly include a chart correction method and an inversion method. The chart correction method is to calculate an Rt value according to resistivity logging values of a deep investigate double lateral resistivity log (RLLD)/shallow investigate double lateral resistivity log (RLLS) and a flushed zone formation resistivity (Rxo). Through this method, the correction effect on low salinity mud filtrate invasion is good, but that on high salinity mud filtrate invasion is not ideal. Currently, the common methods to calculate an invasion radius using logging data include Tan's estimation method, volumetric method and skin factor method. The above methods do not consider dynamic change features of an invasion process over time, and it is difficult to reflect the nature of original formation, especially in the seriously invaded formation, with inaccurate calculation results. The main idea of electrical logging inversion is to linearize the nonlinear problem, study the dynamic response relationship between resistivity logging and mud filtrate invasion by numerically simulating the process of mud filtrate invasion, and obtain parameters such as an Rt value and an invasion radius by the inversion of resistivity logging curve, to complete the invasion correction of the measured resistivity of formation. Currently, the common electrical logging inversion methods include information processing correction method based on inverse fast Fourier transform (IFFT), Newton-singular value decomposition (SVD) inversion method, damping least square method based on a finite element numerical calculation model, distribution robust reinforcement learning (DRRL) model inversion method based on multiple logging information, and numerical mode-matching method (NMM). The information processing correction method based on IFFT is suitable for low salinity mud wells, simplifying formation information, and has the disadvantages of low accuracy and high cost. The Newton-SVD inversion and particle swarm optimization algorithm has reduced requirements on the selection of initial values, with a slow convergence rate. The common resistivity curve inversion mainly depends on a chart, which can provide an approximate value of an invasion radius, but the change rule of fluid properties of mud filtrate invasion formation around a well cannot be obtained. The inversion method can be used to visually describe an invasion profile and accurately determine an Rt value and an invasion radius. However, in practical applications, the operability is complex and a huge amount of sample data is required, especially requiring the filtering, processing and correction of original data.

The prior art I has the following technical solutions. A method for calculating true formation parameters based on logging data (CN 111350490 A) is provided. Simulation experiments are performed in a laboratory using coring data to form a transformation model between target parameters and various influencing factors. Measurement results in the laboratory are combined with a logging curve to form a logging curve calibration model, calibrating the logging curve. The corresponding formation parameters with higher accuracy are calculated using the new calibrated logging curve. Therefore, a series of problems such as the inability of logging curve caused by the distortion of logging results under a mud filtrate invasion condition are reduced. According to an original logging curve, a target depth section of formation parameters needing to be calculated is determined, and the formation information of the target depth section is acquired. Under laboratory and simulated real formation conditions, simulation experiments are performed on the formation parameters needing to be calculated to obtain the response law between the formation parameters and influencing factors and establish a transformation model and a calibration model. Finally, the logging curve is compensated or corrected to obtain the true formation parameters to reduce the inaccurate influence of mud filtrate invasion on the logging curve.

However, the adopted experimental method in the prior art I has the disadvantages of the long time for obtaining data, complicated experimental means and high cost. It is necessary to calibrate the core and establish the transformation model and the calibration model of experiments and formation conditions. The accuracy of transformation parameters is difficult to be ensured and the accuracy of the models is not high. This method does not consider the Rxo anomaly caused by factors such as diameter expansion and invasion, and the error of input parameters will lead to an unreliable correction curve.

The prior art II has the following technical solutions. A new invasion correction method for resistivity based on Archie's formula (CN 103628871 A) is provided. A minimum flow pore throat radius of an oil reservoir is calculated using an average capillary pressure curve, an irreducible water saturation of each capillary pressure curve is calculated according to the minimum flow pore throat radius, and a formation resistivity is inversely calculated from the Archie's formula. The Rt obtained above and a logging test resistivity at the same depth are statistically analyzed to obtain the correlation therebetween, to further obtain a resistivity correction model. In this method, an irreducible water saturation of a gas interval is determined by mercury intrusion data, and petroelectric parameters are substituted into the Archie's formula. The formation resistivity is inversely calculated by the Archie's formula, which represents an Rt. The Rt and an apparent resistivity (Ra) of logging at the same depth are statistically analyzed to determine a correlation coefficient and a correction formula, and establish the resistivity correction model.

However, parameters in the Archie's formula in the prior art II are influenced by many factors, such as pore structure, temperature, pressure, and muddy content. However, the actual formation conditions are complicated. This method does not consider the influences of muddy and heterogeneity.

The prior art III has the following technical solution. A determination method and system for formation mud filtrate invasion based on an adaptive model (CN 107451313 B) are provided. Logging curves corresponding to different formation depths are collected to construct an adaptive resistivity model; an array induction logging curve is constructed, and an array induction logging response curve including parameters to be solved is constructed according to the adaptive resistivity model; and after the parameters to be solved are determined, the array induction logging curves are inverted according to the logging curves at different formation depths to determine the parameters to be solved. In an actual inversion process, an inversion model has a great influence on results and accuracy. Currently, a formation transition zone is commonly used as a linear change model, which is inconsistent with an actual process of mud filtrate invasion into formation. In this method, a modified reciprocal model is used, which can automatically adapt to the formation situation. The inversion result is not only consistent with the morphology of mud filtrate invasion into formation, but also improves the accuracy of inversion formation resistance profile and reduces the inversion error.

However, the model in the prior art III has many constructions and complex parameters, and the error has a great influence on the correction results. This method is mainly aimed at array induction logging curve processing, the adaptive model has high requirements for the selection of original data samples, and it is not easy to obtain good performance of sample data from the true formation information. Therefore, it is urgent to design a new invasion correction method and system for resistivity logging.

Through the above analysis, the problems and defects in the available technologies are as follows.

(1) The existing chart correction method is to calculate the Rt value according to the resistivity logging values of RLLD/RLLS and Rxo, which is not ideal for the invasion correction of high salinity mud.

(2) Currently, the method for calculating an invasion radius using the logging data does not consider the dynamic change features of the invasion process over time, and it is difficult to reflect the nature of original formation, especially in the seriously invaded formation, with inaccurate calculation results.

(3) The existing information processing correction method based on IFFT is suitable for low salinity mud wells, simplifying formation information, and has the disadvantages of low accuracy and high cost. The Newton-SVD inversion and particle swarm optimization algorithm has the slow convergence rate.

(4) The existing resistivity curve inversion mainly depends on the chart, and the change rule of fluid properties of mud filtrate invasion formation around the well cannot be obtained. In practical applications, the inversion method has complex operability and the requirement of a huge amount of sample data, especially requiring the filtering, processing and correction of original data.

(5) The adopted experimental method in the prior art has the disadvantages of the long time for obtaining data, complicated experimental means and high cost. It is necessary to calibrate the core and establish the transformation model and the calibration model of experiments and formation conditions. The accuracy of transformation parameters is difficult to be ensured and the accuracy of the models is not high. The Rxo anomaly caused by the factors such as diameter expansion and invasion is not considered, and the error of input parameters will lead to the unreliable correction curve.

(6) The parameters in Archie's formula in the prior art are influenced by many factors, while the actual formation conditions are complex, and the influences of muddy and heterogeneity are not considered. The model in the prior art has many constructions and complex parameters, and the error has a great influence on the correction results. The adaptive model has high requirements for the selection of original data samples, and it is not easy to obtain good performance of sample data from the true formation information.

SUMMARY

In view of the problems in the prior art, the present disclosure provides an invasion correction method and system for resistivity logging.

The present disclosure is achieved by the invasion correction method for resistivity logging. According to the invasion correction method, multiple sets of charts are formed based on forward modeling, a correction coefficient for invasion is calculated by using a random forest method and an inversion method to output a formation resistivity, and the forward modeling method and the inversion method are combined for invasion correction. Taking Rxo, RLLD, and RLLS as input parameters, formation conditions are determined by the random forest method, and multiple sets of charts are merged into one set. A correction coefficient is calculated through nonlinear training, and a resistivity after invasion correction is finally outputted.

In a complex borehole condition, Rxo is greatly affected by the borehole, and the reading value of micro-spherical focused logging parameters is not accurate, so it is necessary to control parameters. In the present disclosure, considering that an actual formation is a gradient formation, it is necessary to control data errors of a diameter expansion point and upper and lower sampling points within an adaptive range, to increase the scope of application of the chart and perform arbitrary borehole condition correction.

Specifically, the following steps are included:

step one, analyzing mud filtrate invasion features based on an actual resistivity logging curve;

step two, determining an invasion relationship, and performing forward modeling on a resistivity logging response;

step three, forming a correction chart by extracting invasion input and output parameters and performing inversion to extract a correction coefficient combining with a random forest method;

step four, outputting a preliminary correction result, and performing parameter constraint control under a complex borehole condition to output a final formation resistivity and an invasion depth; and step five, performing inspection on a corrected resistivity curve combining with an actual gas test result.

Further, in step one, the mud filtrate invasion features are analyzed based on the actual resistivity logging curve, and invasion types are classified into 4 types: non-invasion, weak invasion, medium invasion and deep invasion according to a radial depth of mud filtrate invasion into formation.

Further, a depth of the weak invasion is less than 1.8 m, a depth of the medium invasion is between 1.8 m and 3.05 m, and a depth of the deep invasion is greater than 3.05 m.

Further, in step two, according to a theoretical response simulation result, under a low invasion condition, the greater the invasion depth, the greater the influence on the resistivity of reservoirs, and when the invasion depth is increased to a certain extent, the change of resistivity logging curve tends to be flat and the invasion stops gradually; with the increase of a gas saturation (Sg) in reservoirs, the invasion influence on the resistivity of reservoirs increases, and the gas-bearing property seriously affects a scope of mud filtrate invasion; and whether in a gas layer or a water layer, with the increase of mud filtrate filled in an invaded zone, the invasion influence on the resistivity of reservoirs increases.

Further, in step three, an invasion correction chart is made by the random forest method, the random forest method being an algorithm integrating multiple decision trees to extract input parameters according to combined changes Rx and Ry of resistivity logging curves of a flushed zone, a transitional zone and undisturbed formation, $$Rx = R11d/R11s \tag{1}$$

$$Ry = Ra^{*}T_t/(\alpha^{*}(T+T_0)*Rxo) \tag{2}$$

where Ra is measurement data at a depth point corresponding to the resistivity logging curve, α is a conversion coefficient under a well diameter condition, $T_t$ is a temperature after engineering correction conversion, T is a formation temperature corresponding to an actual well depth, $T_0$ is a surface temperature, and Rxo is a flushed zone formation resistivity; and for the classification problem, a category of output is determined by a mode of outputs of individual trees; and for the regression problem, outputs of various decision trees are averaged to obtain a final regression result.

Further, in a process of actual well data analysis treatment, the array induction logging series curve of each well section in an analytical work area is missing or not used. The array induction logging curve with good reflection on an undisturbed formation does not have the adaptability of the whole area, while a double lateral logging series has been used for each well section in the whole well area. Therefore, the double lateral logging series is corrected to obtain an accurate logging response curve.

In a process of making the invasion correction chart, multiple charts are merges into one set by using the random forest method. The Rxo, RLLD, RLLS, different temperature parameters and the conversion coefficient under a well diameter condition are used as the input parameters. Finally, a corrected RLLD is outputted to form a complete set of double lateral correction charts.

Another object of the present disclosure is to provide an invasion correction system for resistivity logging by applying an invasion correction method for resistivity logging, including:

a feature analysis module, configured to analyze mud filtrate invasion features based on an actual resistivity logging curve;

a resistivity forward modeling module, configured to determine an invasion mechanism, and perform forward modeling on a resistivity logging response;

a correction chart construction module, configured to perform inversion by a random forest method to form a correction chart;

a parameter control module, configured to output a formation resistivity and perform parameter control under a complex borehole condition; an instance verification module, configured to perform inspection on an actual gas test result; and an arbitrary borehole condition correction module, configured to perform parameter control, and control, when the difference between correction values of two adjacent points is less than an adaptive range, data errors of a diameter expansion point and upper and lower sampling points within the adaptive range, to increase an applicable range of the chart and perform arbitrary borehole condition correction.

Another object of the present disclosure is to provide a computer device, including a memory and a processor, the memory storing a computer program which, when executed by the processor, causes the processor to execute the steps of:

analyzing mud filtrate invasion features based on an actual resistivity logging curve; determining an invasion mechanism, and performing forward modeling on a resistivity logging response; performing inversion by a random forest method to form a correction chart; outputting a formation resistivity, and performing parameter control under a complex borehole condition; and performing inspection on an actual gas test result.

Another object of the present disclosure is to provide a computer-readable storage medium, storing a computer program which, when executed by a processor, causes the processor to execute the steps of:

analyzing mud filtrate invasion features based on an actual resistivity logging curve; determining an invasion mechanism, and performing forward modeling on a resistivity logging response; performing inversion by a random forest method to form a correction chart; outputting a formation resistivity, and performing parameter control under a complex borehole condition; and performing inspection on an actual gas test result.

Another object of the present disclosure to provide an information data processing terminal for implementing an invasion correction system for resistivity logging.

By combining the above technical solutions and the solved technical problems, the claimed technical solutions of the present disclosure have the following advantages and positive effects.

Firstly, taking an area block as an example, in the present disclosure, perforation intervals in original well data in a study work area have 123 layers, of which the initial interpretation of 95 layers is inconsistent with the conclusion of perforation interpretation, and after resistivity correction and analysis, intervals of the initial interpretation inconsistent with the conclusion of perforation interpretation are reduced to 19 layers. A gas layer is greatly affected by invasion, and a measured resistivity is smaller. After correction, the resistivity is mainly increased. A gas-water layer is mainly affected by the high resistance surrounding rock, leading to a larger measured resistivity, and a part of the intervals is affected by invasion, leading to a smaller measured resistivity, so the resistivity is increased or decreased after the correction, and a correction value for the gas-water layer is the largest. Most of the water layer is affected by high invasion, and a measured resistivity is larger, so the resistivity is mainly decreased after correction. A small part of the water layer is affected by low resistance surrounding rock and high salinity formation water, and a measured resistivity is smaller. Finally, the correlation between logging interpretation results after double lateral resistivity correction and actual perforation gas test results has been greatly improved, which lays a research foundation for the subsequent reservoir gas-bearing property evaluation, and can make a rough discrimination of reservoir fluid properties according to corrected RLLD and RLLS values.

In the present disclosure, a standard mud filtrate invasion chart is formed by stacking a plurality of traditional charts under different formation or instrument conditions, it is determined that which type of formation conditions a reservoir section belongs to according to the random forest method, a correction coefficient is read in combination with non-linear training, and finally, a corrected resistivity value is obtained. Compared with the inversion of three resistivity curves based on micro-resistivity, medium investigation induction logging resistivity (RILM) and deep investigation induction logging resistivity (RILD), the implementation of the method mainly depends on the chart method, but the time effect of invasion and the dynamic features during invasion are not considered in the correction, so it is difficult to reflect the nature of the original formation, especially in the seriously invaded formation. The RLLD is the resistivity that can only be detected in an invaded zone, and it is difficult to calculate a more accurate mud filtrate invasion radius. In the conventional resistivity curve inversion method, only the influence of mud filtrate invasion is considered, and the borehole expansion of an actual reservoir is also an important factor influencing the resistivity. Therefore, it is also the innovation point of the present disclosure to define the main control factors and control the difference of an adaptive range of parameters.

For a tight sandstone gas reservoir with low porosity and low permeability, it is easy to be affected by various complex factors such as structure, lithology, and drilling fluid properties. The double lateral logging information has limited ability to distinguish gas and water layers, and a resistivity response value is very different from the actual formation information, affecting the identification of reservoir fluid. Mud filtrate invasion is one of the key factors. Therefore, in the present disclosure, a method for correcting a double lateral logging series by an Rxo logging series is used to reduce the true response information of the formation and improve the accuracy of RLLD and RLLS values.

In the present disclosure, based on the actual resistivity logging curve, invasion types are classified into 4 types: non-invasion, weak invasion, medium invasion and deep invasion according to a radial depth of mud filtrate invasion into formation. After the theoretical response simulation results are analyzed and the influence mechanism of mud filtrate invasion on measured resistivity is clarified, a large number of data are formed into new chart data with forward modeling response, and it is determined that which type of formation conditions it belongs to by using the random forest method. The correction coefficient is calculated through nonlinear training, and finally the correction chart is synthesized and a corrected formation resistivity value is output.

In an actual process of mud filtrate invasion into undisturbed formation, it will inevitably be affected by the borehole expansion. The analysis of the double lateral logging series at a 1× well section shows that there is no obvious diameter expansion at this section. The difference between RLLD and RLLS of gas layer before correction is small, the discrimination is not large, and the determination limit of an invasion depth is not obvious. After correction of the double lateral logging series, there is obvious invasion at a gas-bearing section, which is consistent with an actual invasion degree of this reservoir section (as shown in FIG. 6).

For the double lateral logging series in a 2× well section, there is obvious diameter expansion at this section. The difference between RLLD and RLLS of gas layer before correction is small, the discrimination is not large, and the determination limit of an invasion depth is not obvious. After correction of the double lateral logging series, the resistivity change of gas-bearing section is not obvious. The Rxo value, as an input parameter, is greatly affected by the diameter expansion. Therefore, when the double lateral resistivity is corrected, the influence of diameter expansion on the Rxo value is to be considered, which requires careful use. However, in the case of borehole anomaly, taking the diameter expansion as a determination condition, it does not affect the identification of actual gas-bearing property of the reservoir when the difference of correction values of two adjacent points is less than the adaptive range. Therefore, it is possible to define the size of invasion correction value by adopting the difference of correction value smaller than the adaptation range (as shown in FIG. 7).

Similarly, in the correction of the double lateral logging series at the 2× well section, it can be seen by comparing curves before and after correction without controlling parameters that the correction without controlling the other parameters causes the dramatic change in the corrected curve, thus failing to form an effective correction result, and the parameter screening and control must be performed (as shown in FIG. 8).

However, in the case where a control range of correction parameters is too large, it can be seen by comparing curves before and after correction that false invasion occurs in a non-reservoir section, so the control range of parameters cannot be too large (as shown in FIG. 9).

To sum up, taking the diameter expansion as the determination condition, in the case of borehole anomaly, the size of invasion correction value can still be limited by the fact that the difference of correction values between two adjacent points is less than the adaptive range.

Secondly, for a tight sandstone gas reservoir in a study area, the mud filtrate invasion phenomenon is more obvious in a reservoir section, and the difference is greater for different logging series. Even the invasion tends characterized by different logging series in the same interval are completely opposite. Therefore, on the basis of the analysis of mud filtrate invasion features of tight sandstone reservoirs and the influence on resistivity logging series, the present disclosure aims to correct double lateral logging series curves to reflect more real formation information, reduce the error of resistivity value caused by mud filtrate invasion, thus improving the accuracy of fluid identification in various well sections.

The key technology for correction in the present disclosure is as follows. Taking Rxo, RLLD and RLLS as the input parameters, the formation conditions are determined by the random forest method, and the multiple sets of charts are merged into one set of correction database suitable for various complex borehole-formation conditions. The correction coefficient is calculated through nonlinear training, and the resistivity after invasion correction is finally outputted.

In the complex borehole condition, Rxo is greatly affected by the borehole, and the reading value of the new chart is not accurate, so it is necessary to control the parameters. Considering that an actual formation is a gradient formation, it is necessary to control the data errors of the diameter expansion point and the upper and lower sampling points within the adaptive range, to increase the scope of application of the chart and perform arbitrary borehole condition correction.

In the present disclosure, new chart data is formed based on a large number of rapid and accurate forward modeling data, and the random forest inversion method is combined to calculate the correction coefficient to obtain a resistivity value after invasion correction, to complete the double lateral correction under the invasion condition, while the chart method and the inversion method are combined to ensure the accuracy of correction. In the present disclosure, the mud filtrate invasion correction method is more systematic and procedural by identifying the parameter control of the chart under the diameter expansion condition.

In the present disclosure, considering the mud filtrate invasion correction under the action of diameter expansion and the parameter control, the scope of application of the chart is increased, and the accurate use of the chart is ensured based on the actual formation conditions. In the present disclosure, the forward modeling results are combined with the actual formation conditions to make comprehensive determination and invasion correction of resistivity logging, improving the accuracy and speed of correction, making the resistivity value reflected by the corrected resistivity logging closer to the actual formation resistivity, and providing technical support for subsequent fluid identification in oil-gas reservoirs.

Thirdly, as inventive auxiliary evidence of claims of the present disclosure, it is also embodied in the following important aspects.

(1) The expected profit and commercial value after the conversion of the technical solutions of the present disclosure are as follows. The invasion correction under the complex borehole condition can be considered and the parameters are controlled. Compared with the traditional invasion correction technology, the technical solutions of the present disclosure are more perfect, and have a wider application range of charts and more commercial value for the correction technology of tight sandstone reservoirs. The existing technology of mud filtrate invasion correction in tight sandstone reservoirs is not perfect, and the correction effect is better by using the forward modelling method and the inversion method, which can be popularized. The real resistivity value of gas layer can be provided, the accuracy of subsequent gas-water identification is improved and exploration and development costs are saved.

(2) The technical solutions of the present disclosure solve the technical problems that people have been eager to solve, but have never been successful, solving the technical problem of invasion correction under the borehole condition, clarifying main control factors, controlling the difference of parameter ranges, and outputting accurate resistivity values.

BRIEF DESCRIPTION OF THE DRAWINGS

In order to explain technical solutions in examples of the present disclosure clearer, the drawings needed in the examples of the present disclosure are briefly introduced below. Obviously, the drawings in the following description are only examples of the present disclosure, and other drawings can be obtained according to the provided drawings without creative work for those of ordinary skill in the art.

FIG. 5(*b*) is a schematic diagram of a new double lateral invasion correction chart-di according to an example of the present disclosure.

Figure 1:
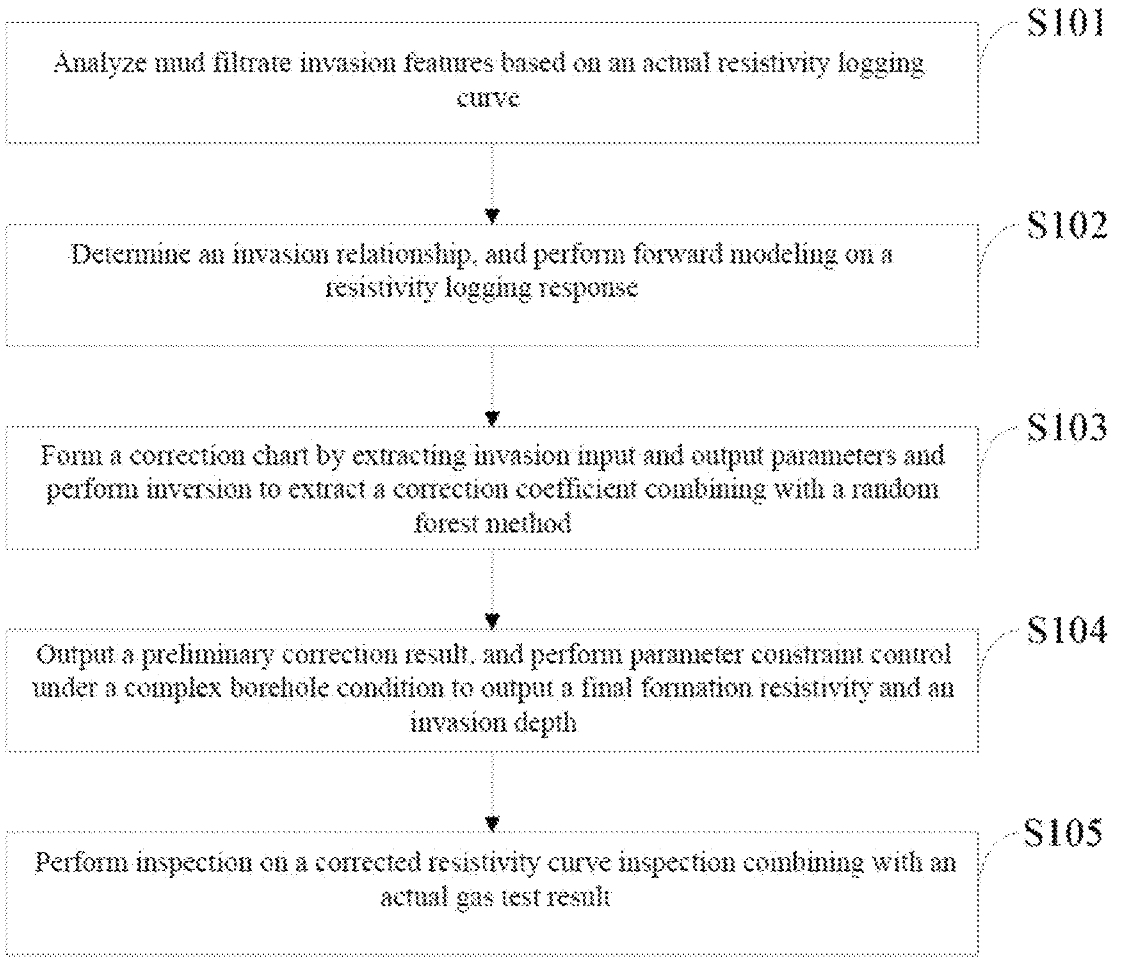
FIG. 1 is a flow chart of an invasion correction method for resistivity logging according to an example of the present disclosure.

Reference numerals and denotations thereof: 1—feature analysis module; 2—resistivity forward modeling module; 3—correction chart construction module; 4—parameter control module; and 5—instance verification module.

DETAILED DESCRIPTION

In order to make objects, technical solutions and advantages of the present disclosure clearer, the present disclosure is further explained in detail with examples. It is to be understood that the specific examples described herein are only used for explaining rather than limiting the present disclosure.

In view of the problems in the prior art, the present disclosure provides an invasion correction method and system for resistivity logging. The present disclosure is described in detail with reference to the attached drawings. LLS: shallow investigation laterolog; and LLD: deep investigation laterolog.

As shown in FIG. 1, an example of the present disclosure provides an invasion correction method for resistivity logging, including the following steps.

In S101: mud filtrate invasion features are analyzed based on an actual resistivity logging curve.

In S102: an invasion relationship is determined, and forward modeling is performed on a resistivity logging response.

In S103: a correction chart is formed by extracting invasion input and output parameters and inversion is performed to extract a correction coefficient combining with a random forest method.

In S104: a preliminary correction result is outputted, and parameter constraint control is performed under a complex borehole condition to output a final formation resistivity and an invasion depth.

In S105: inspection is performed on a corrected resistivity curve combining with an actual gas test result.

Figure 2:
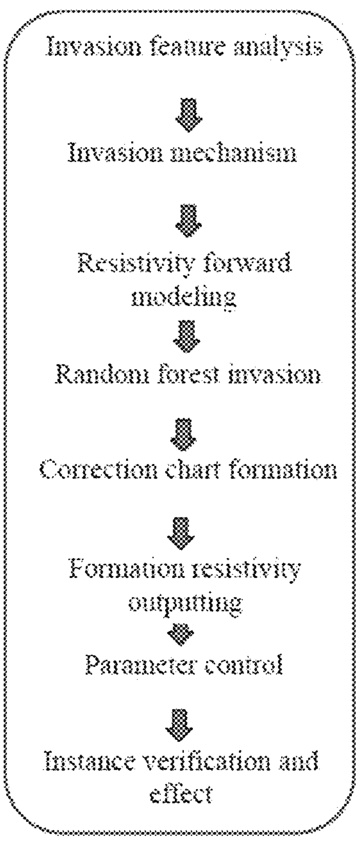
FIG. 2 is a schematic diagram of the invasion correction method for resistivity logging according to an example of the present disclosure.

As shown in FIG. 2, an example of the present disclosure provides a schematic diagram of the invasion correction method for resistivity logging.

Figure 3:
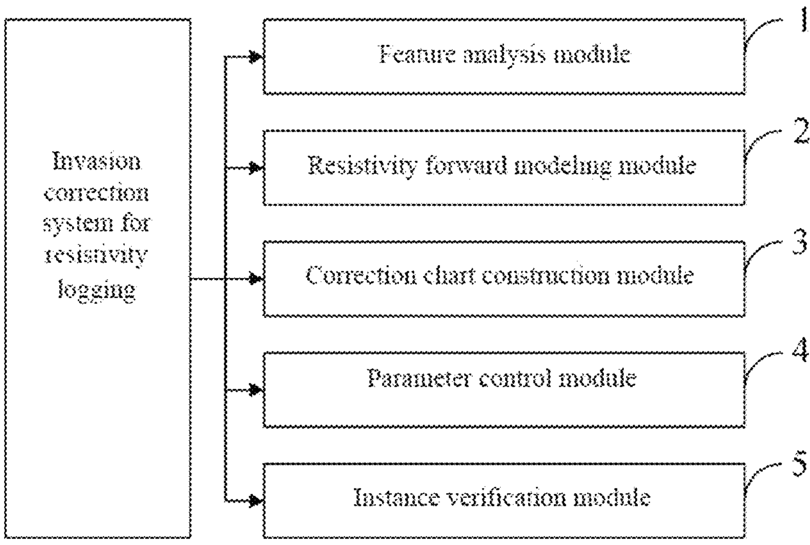
FIG. 3 is a structural block diagram of an invasion correction system for resistivity logging according to an example of the present disclosure.

As shown in FIG. 3, an example of the present disclosure provides an invasion correction system for resistivity logging, including:

a feature analysis module 1, configured to analyze mud filtrate invasion features based on an actual resistivity logging curve;

a resistivity forward modeling module 2, configured to determine an invasion mechanism, and perform forward modeling on a resistivity logging response;

a correction chart construction module 3, configured to perform inversion by a random forest method to form a correction chart;

a parameter control module 4, configured to output a formation resistivity and perform parameter control under a complex borehole condition; and an instance verification module 5, configured to perform inspection on an actual gas test result; and 1. Technical Problems to be Solved by the Present Disclosure (Object of the Present Disclosure)

In a process of oil and gas development, the electrical property of formation around a borehole changes due to the invasion of mud filtrate, seriously affecting the accuracy of logging data to identify fluid types. Under the action of the pressure difference between the borehole and the undisturbed formation, the mud filtrate penetrates deep into the formation. The penetration of mud filtrate makes the radial resistivity distribution of the permeable layer become complex, directly affecting the logging results of resistivity and fluid identification. Especially for a tight sandstone gas reservoir in a study area, the mud filtrate invasion phenomenon is more obvious in a reservoir section, and the difference is greater for different logging series. Even the invasion tends characterized by different logging series in the same interval are completely opposite. Therefore, on the basis of the analysis of mud filtrate invasion features of tight sandstone reservoirs and the influence on resistivity logging series, the present disclosure aims to correct double lateral logging series curves to reflect more real formation information, reduce the error of resistivity value caused by mud filtrate invasion, thus improving the accuracy of fluid identification in various well sections.

2. The Complete Technical Solutions Provided by the Present Disclosure (Inventive Solutions)

Double lateral logging is one of the key logging data for determining the gas-bearing property of the formation. However, for this type of a tight sandstone gas reservoir with low porosity and low permeability, due to the influences of various complex factors such as structure, lithology and drilling fluid properties, the logging information has limited ability to distinguish gas and water layers, bringing difficulties to fluid identification on the reservoir. According to the original logging curve, the difference between RLLD and RLLS of each reservoir section is small. Especially, the discrimination on the gas-water layer is not large, the invasion phenomenon is not obvious, seriously affecting the determination of a discrimination boundary between the gas-water layer and the water layer. Therefore, in the present disclosure, a method for correcting a double lateral logging series by an Rxo logging series is used to reduce the true response information of the formation, and improve the accuracy of RLLD and RLLS values, and directly make a rough discrimination on the fluid property of the reservoir according to the difference of RLLD and RLLS. In the present disclosure, combining with the results of mud filtrate invasion feature analysis and theoretical response simulation, an invasion correction technique for resistivity logging is created: invasion feature analysis→resistivity logging response simulation→random forest method calibration chart→parameter control under the complex borehole condition→actual gas test result inspection.

In the present disclosure, the mud filtrate invasion features are analyzed based on the actual resistivity logging curve, and the invasion types are divided into 4 types according to the radial depth of mud filtrate invasion into formation: non-invasion, weak invasion (less than 1.8 m), medium invasion (1.8 m-3.05 m) and deep invasion (greater than 3.05 m). According to the theoretical response simulation result (as shown in FIG. 2), under a low invasion condition, the greater the invasion depth, the greater the influence on the resistivity of reservoirs, and when the invasion depth is increased to a certain extent, the change of resistivity logging curve tends to be flat and the invasion stops gradually; with the increase of an Sg in reservoirs, the invasion influence on the resistivity of reservoirs increases, and the gas-bearing property seriously affects a scope of mud filtrate invasion; and finally, whether in a gas layer or a water layer, with the increase of mud filtrate filled in an invaded zone, the invasion influence on the resistivity of reservoirs increases.

In the present disclosure, an invasion correction chart is made by the random forest method, the random forest method being an algorithm integrating multiple decision trees. For the classification problem, a category of output is determined by a mode of outputs of individual trees. The invasion correction chart is made by the random forest method, the random forest method being an algorithm integrating multiple decision trees to extract input parameters according to combined changes Rx and Ry of resistivity logging curves of a flushed zone, a transitional zone and undisturbed formation, $$Rx = R11d/R11s \tag{1}$$

$$Ry = Ra^{*}T_t/(\alpha^{*}(T+T_0)*Rxo) \tag{2}$$

where Ra is measurement data at a depth point corresponding to the resistivity logging curve, α is a conversion coefficient under a well diameter condition, $T_t$ is a temperature after engineering correction conversion, T is a formation temperature corresponding to an actual well depth, $T_0$ is a surface temperature, and Rxo is a flushed zone formation resistivity; and for the classification problem, a category of output is determined by a mode of outputs of individual trees;

and for the regression problem, outputs of various decision trees are averaged to obtain a final regression result.

Figure 4:
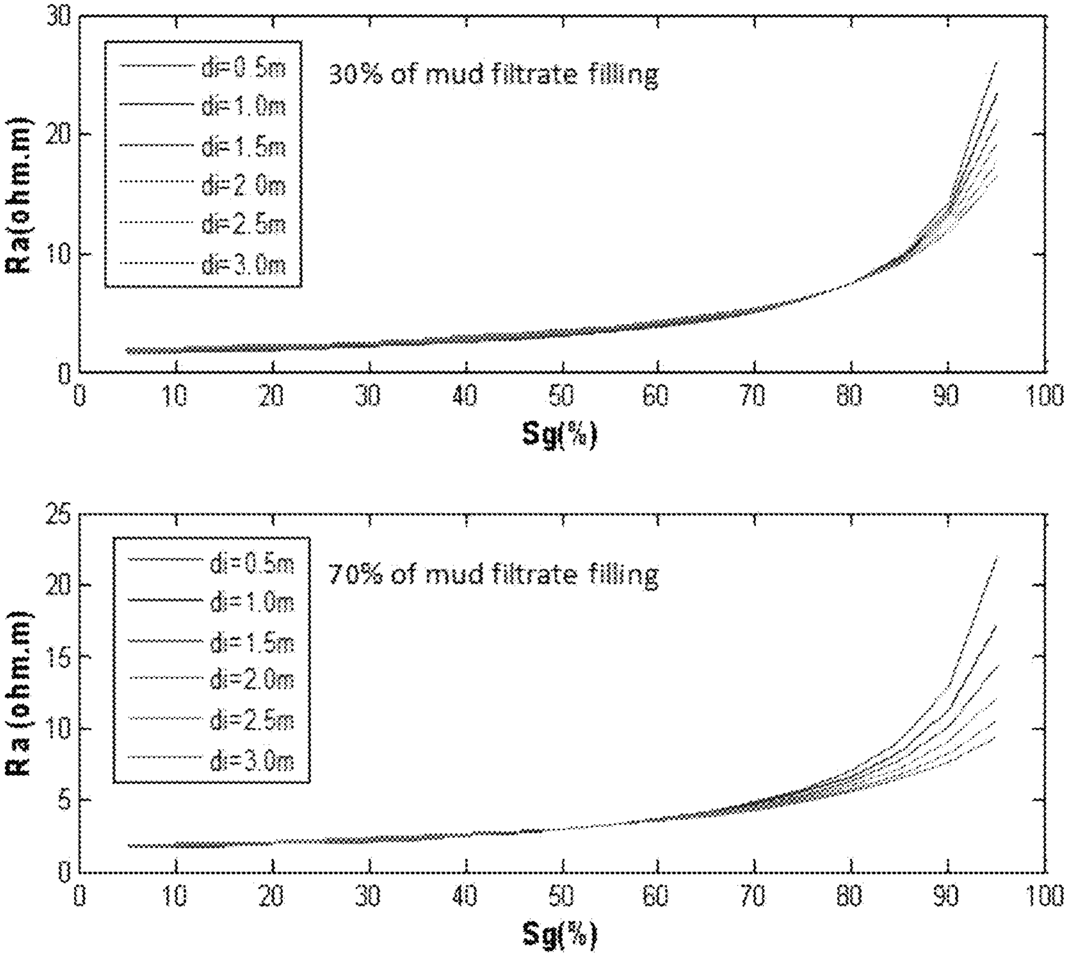
FIG. 4 is a schematic diagram of invasion mechanism analysis according to an example of the present disclosure.

For the regression problem, outputs of various decision trees are averaged to obtain a final regression result. In a process of actual well data analysis treatment, the array induction logging series curve of each well section in a study work area is missing or not used. The array induction logging curve with good reflection on an undisturbed formation does not have the adaptability of the whole area, while a double lateral logging series has been used for each well section in the whole well area. Therefore, the double lateral logging series is corrected to obtain an accurate logging response curve. In a process of making the invasion correction chart, multiple charts are merged into one set by using the random forest method. The Rxo, RLLD and RLLS are used as the input parameters. Finally, a corrected RLLD is outputted to form a complete set of double lateral correction charts (as shown in FIG. 4).

Figure 5A:
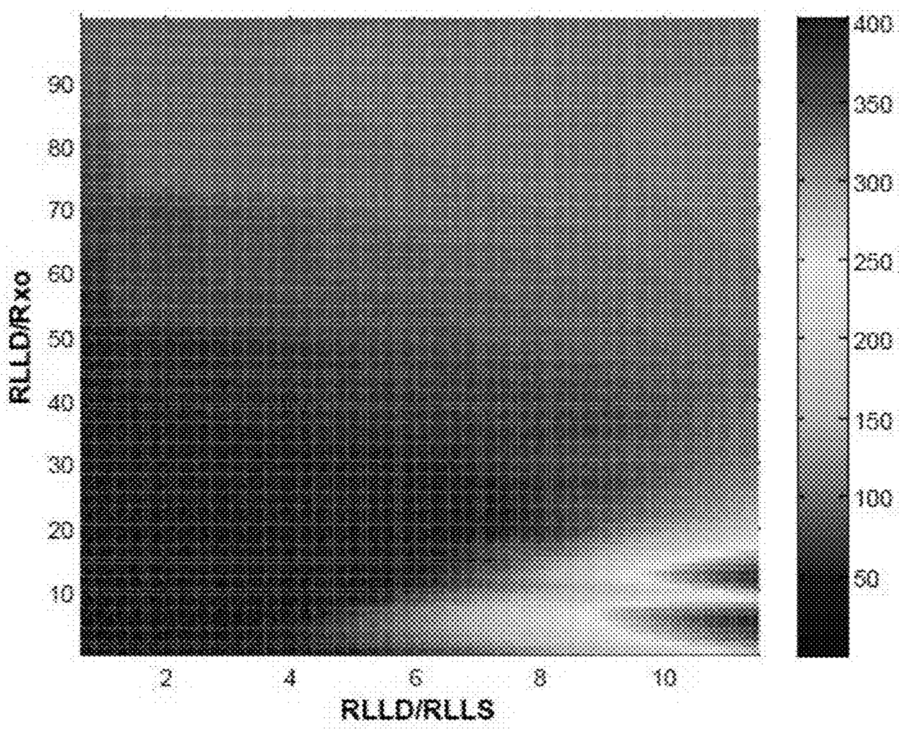
FIG. 5(*a*) is a schematic diagram of a new double lateral invasion correction chart-Rt according to an example of the present disclosure.
Figure 5B:
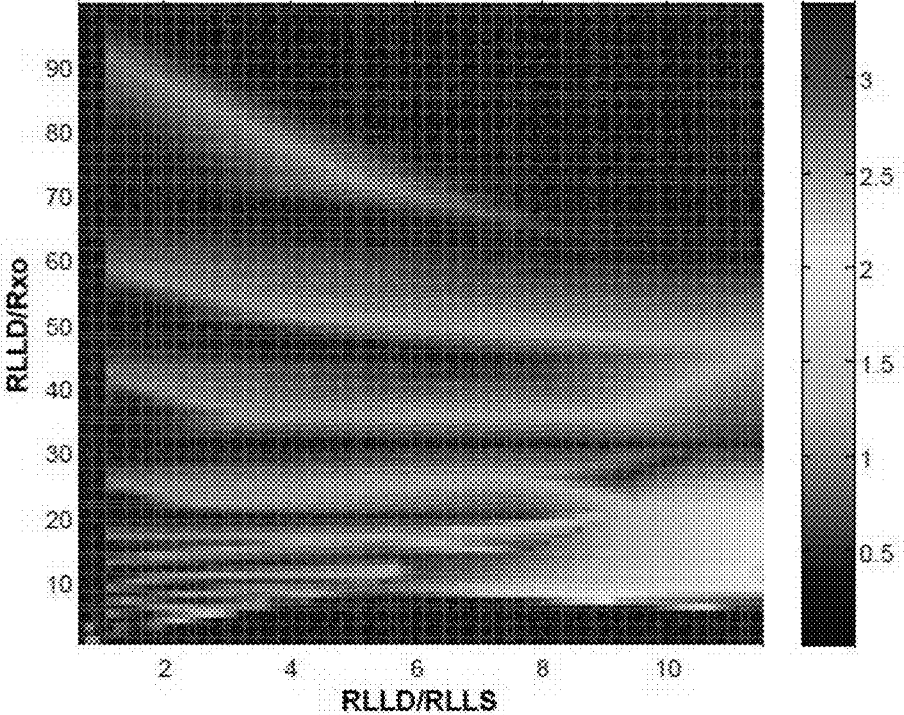

FIG. 5(*a*) is a new double lateral invasion correction chart-Rt, and FIG. 5(*b*) is a new double lateral invasion correction chart-di.

Figure 6:
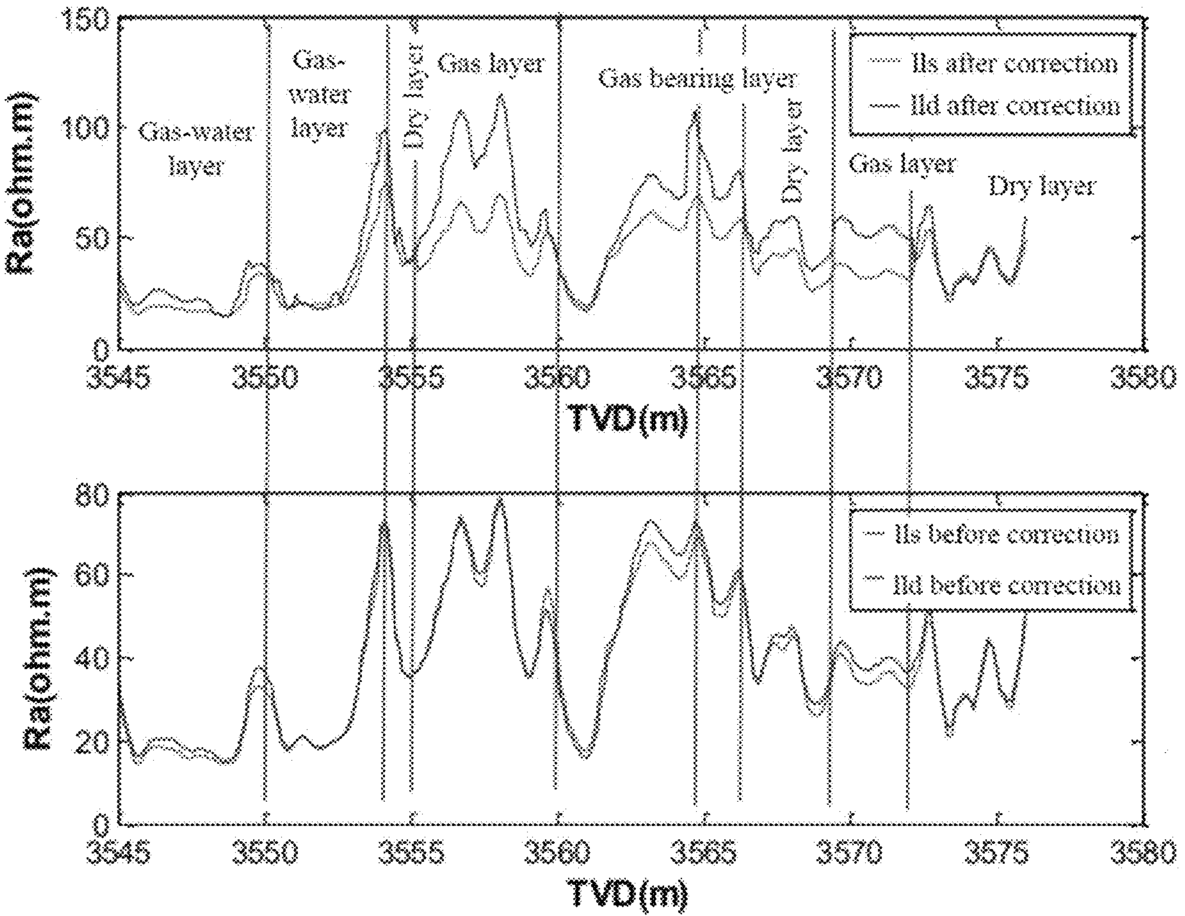
FIG. 6 is a schematic diagram of double lateral invasion correction at a 1× well section (without diameter expansion) according to an example of the present disclosure.

In an actual process of mud filtrate invasion into undisturbed formation, it will inevitably be affected by the borehole expansion. The analysis of the double lateral logging series at a 1× well section shows that there is no obvious diameter expansion at this section. The difference between RLLD and RLLS of gas layer before correction is small, the discrimination is not large, and the determination limit of an invasion depth is not obvious. After correction of the double lateral logging series, there is obvious invasion at a gas-bearing section, which is consistent with an actual invasion degree of this reservoir section (as shown in FIG. 6).

Figure 7:
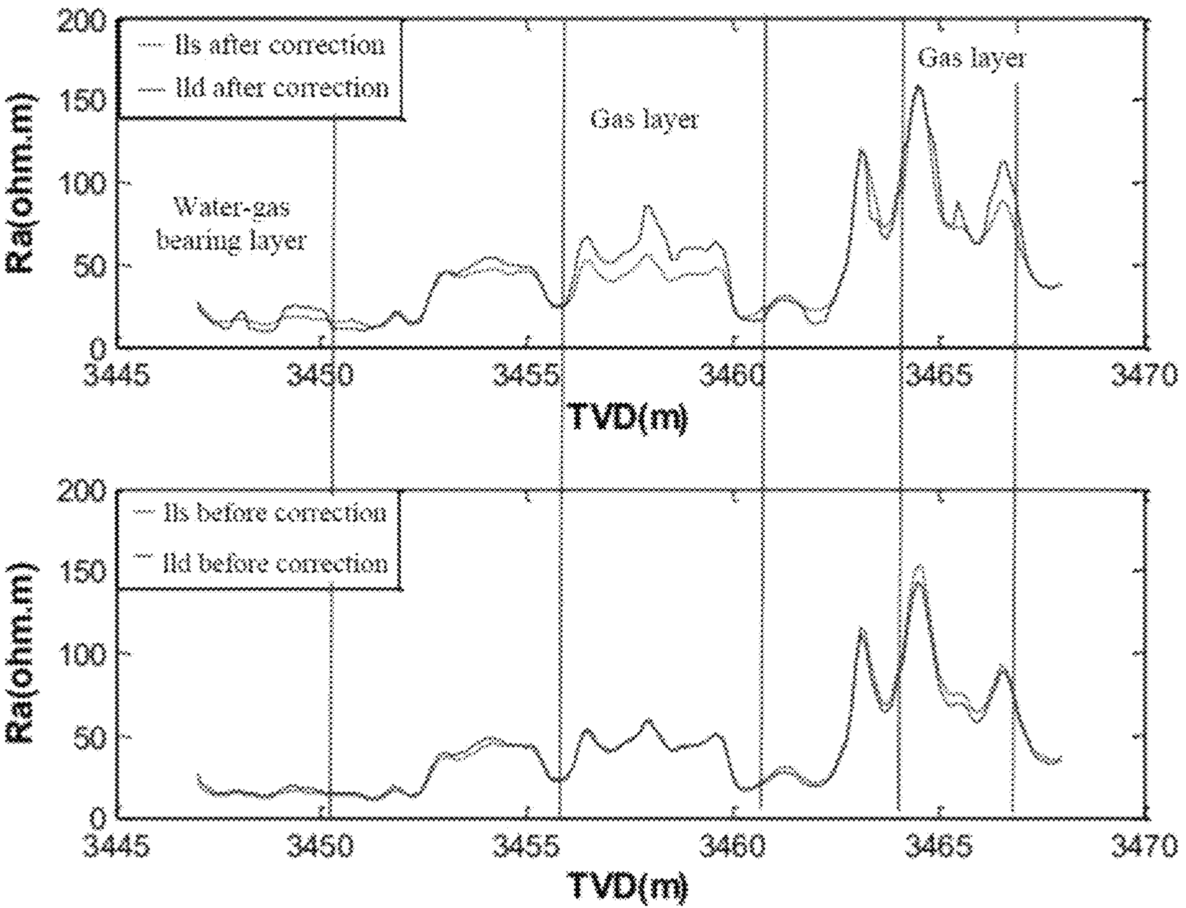
FIG. 7 is a schematic diagram of double lateral invasion correction at a 2× well section (with diameter expansion) according to an example of the present disclosure.

For the double lateral logging series in a 2× well section, there is obvious diameter expansion at this section. The difference between RLLD and RLLS of gas layer before correction is small, the discrimination is not large, and the determination limit of an invasion depth is not obvious. After correction of the double lateral logging series, the resistivity change of gas-bearing section is not obvious. The Rxo value, as an input parameter, is greatly affected by the diameter expansion. Therefore, when the double lateral resistivity is corrected, the influence of diameter expansion on the Rxo value is to be considered, which requires careful use. However, in the case of borehole anomaly, taking the diameter expansion as a determination condition, it does not affect the identification of actual gas-bearing property of the reservoir when the difference of correction values of two adjacent points is less than the adaptive range. Therefore, it is possible to define the size of invasion correction value by adopting the difference of correction value smaller than the adaptation range (as shown in FIG. 7).

Figure 8:
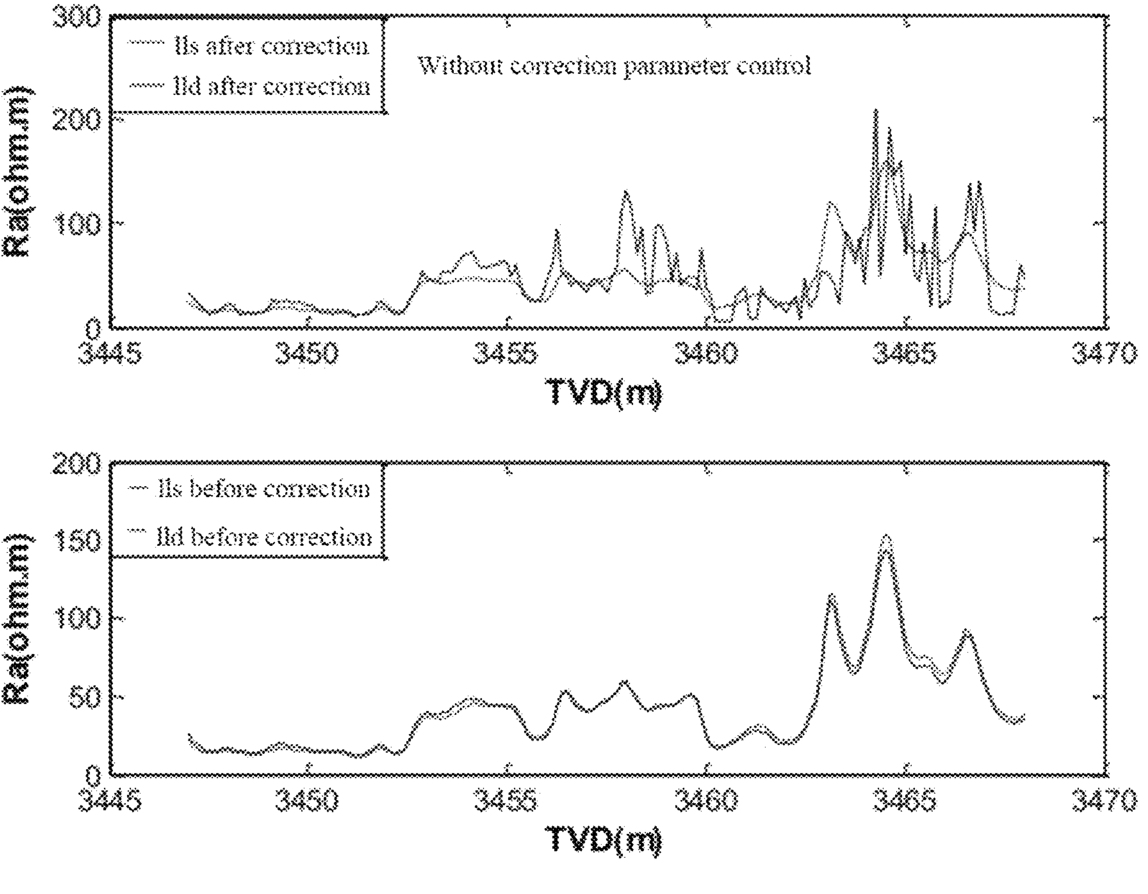
FIG. 8 is a schematic diagram of double lateral invasion correction (without parameter control) at a 2× well section according to an example of the present disclosure.

Similarly, in the correction of the double lateral logging series at the 2× well section, it can be seen by comparing curves before and after correction without controlling parameters that the correction without controlling the other parameters causes the dramatic change in the corrected curve, thus failing to form an effective correction result, and the parameter screening and control must be performed (as shown in FIG. 8).

Figure 9:
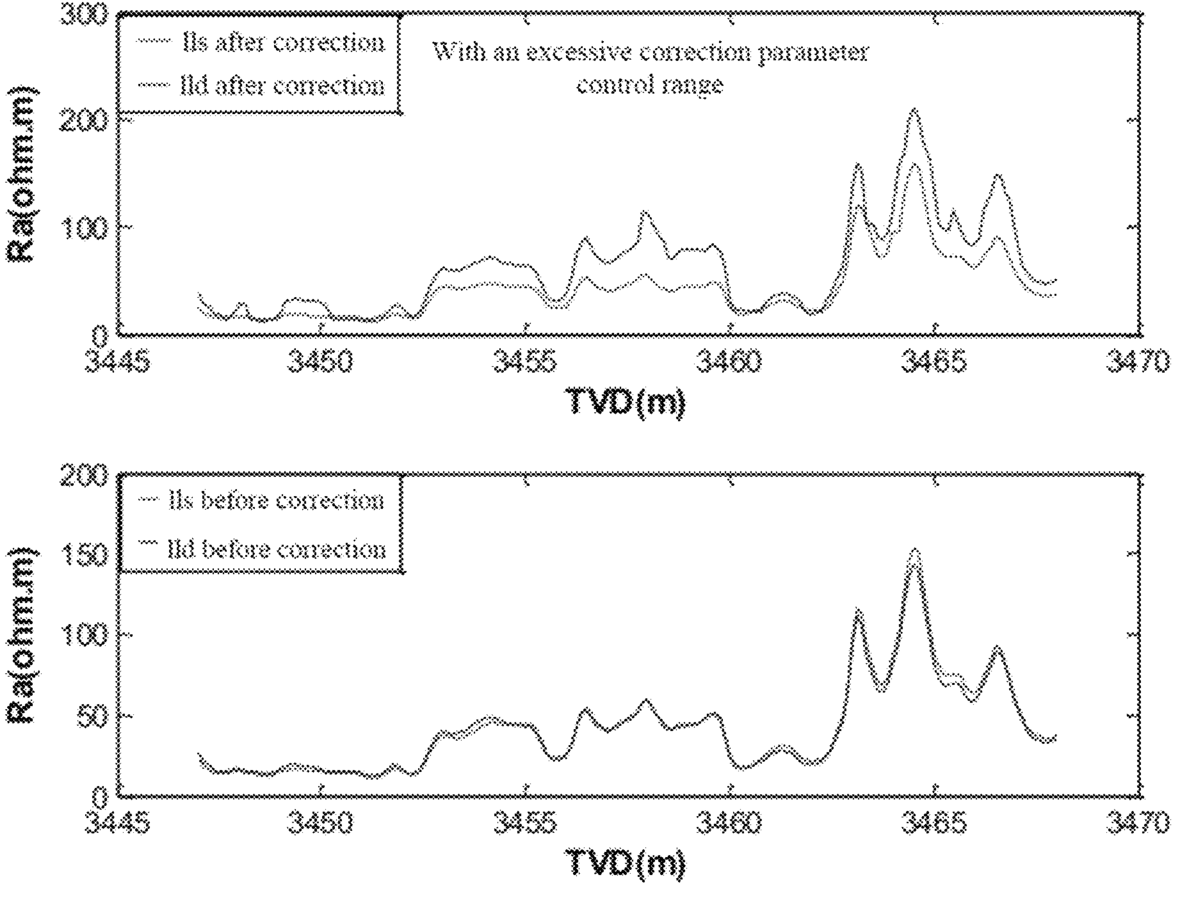
FIG. 9 is a schematic diagram of double lateral invasion correction (with an excessive parameter control range) at a 2× well section according to an example of the present disclosure.

However, in the case where a control range of correction parameters is too large, it can be seen by comparing curves before and after correction that false invasion occurs in a non-reservoir section, so the control range of parameters cannot be too large (as shown in FIG. 9).

FIGS. 6-9 show differential parameter controls under the borehole condition.

To sum up, taking the diameter expansion as the determination condition, in the case of borehole anomaly, the size of invasion correction value can still be limited by the fact that the difference of correction values between two adjacent points is less than the adaptive range.

The key technology for correction in the present disclosure is as follows.

1) Taking Rxo, RLLD and RLLS as the input parameters, the formation conditions are determined by the random forest method, and the multiple sets of charts are merged into one set. The correction coefficient is calculated through nonlinear training, and the resistivity after invasion correction is finally outputted.
2) In the complex borehole condition, Rxo is greatly affected by the borehole, and the reading value of the new chart is not accurate, so it is necessary to control the parameters. Considering that an actual formation is a gradient formation, it is necessary to control the data errors of the diameter expansion point and the upper and lower sampling points within the adaptive range, to increase the scope of application of the chart and perform arbitrary borehole condition correction.

Preferably, an example of the present disclosure provides an invasion correction method for resistivity logging, including the following steps.

In step one, mud filtrate invasion features are analyzed based on an actual resistivity logging curve; and the reliability and available range of logging data are clarified to provide an effective data set for further invasion mechanism analysis and the range of formation parameters for forward modeling.

In step two, an invasion mechanism is determined, and forward modeling is performed on a resistivity logging response; and after the clarification of invasion mechanism, it is better to screen and provide reliable data samples for invasion correction to form an accurate correction chart.

In step three, inversion is performed by a random forest method to form a correction chart; and a resistivity value to be corrected is inputted, the invasion correction chart is calculated by using the inversion method, and the accurate corrected resistivity value is outputted.

In step four, a formation resistivity is outputted and parameter control is performed under a complex borehole condition; and at the same time, considering the influence of an actual borehole (such as diameter expansion), it is highlighted that data errors of a diameter expansion point and upper and lower sampling points are controlled within an adaptive coefficient range, and the applicable conditions of the chart can be increased to perform invasion correction under the complex borehole condition.

In step five, inspection is performed on an actual gas test result; and the actual data is used to inspect the consistency of logging curve after invasion correction.

Compared with the prior art, the present disclosure has the following creative points.

1) In the present disclosure, new chart data is formed based on a large number of rapid and accurate forward modeling data, and the random forest inversion method is combined to calculate the correction coefficient to obtain a resistivity value after invasion correction, to complete the double lateral correction under the invasion condition, while the chart method and the inversion method are combined to ensure the accuracy of correction.
2) In the present disclosure, the systematicness of the general invasion correction method is improved by identifying the parameter control of the chart under the diameter expansion condition.

The creative points of the present disclosure are realized by the following principles.

A standard mud filtrate invasion chart is formed by stacking a plurality of traditional charts under different formation or instrument conditions, it is determined that which type of formation conditions a reservoir section belongs to according to the random forest method, a correction coefficient is read in combination with non-linear training, and finally, a corrected resistivity value is obtained.

Compared with the prior art, the creative points include the following.

Compared with the inversion of three resistivity curves based on micro-resistivity, RILM and RILD, the implementation of the method mainly depends on the chart method, but the time effect of invasion and the dynamic features during invasion are not considered in the correction, so it is difficult to reflect the nature of the original formation, especially in the seriously invaded formation. The RLLD is the resistivity that can only be detected in an invaded zone, and it is difficult to calculate a more accurate mud filtrate invasion radius. In the conventional resistivity curve inversion method, only the influence of mud filtrate invasion is considered, and the borehole expansion of an actual reservoir is also an important factor influencing the resistivity. Therefore, it is also the innovation point of the present disclosure to define the main control factors and control the difference of an adaptive range of parameters.

For a tight sandstone gas reservoir with low porosity and low permeability, it is easy to be affected by various complex factors such as structure, lithology, and drilling fluid properties. The double lateral logging information has limited ability to distinguish gas and water layers, and a resistivity response value is very different from the actual formation information, affecting the identification of reservoir fluid. Mud filtrate invasion is one of the key factors. Therefore, in the present disclosure, a method for correcting a double lateral logging series by an Rxo logging series is used to reduce the true response information of the formation and improve the accuracy of RLLD and RLLS values.

In the present disclosure, based on the actual resistivity logging curve, invasion types are classified into 4 types: non-invasion, weak invasion, medium invasion and deep invasion according to a radial depth of mud filtrate invasion into formation. After the theoretical response simulation results are analyzed and the influence mechanism of mud filtrate invasion on measured resistivity is clarified, a large number of data are formed into new chart data with forward modeling response, and it is determined that which type of formation conditions it belongs to by using the random forest method. The correction coefficient is calculated through nonlinear training, and finally the correction chart is synthesized and a corrected formation resistivity value is output.

In the present disclosure, considering the mud filtrate invasion correction under the action of diameter expansion and the parameter control, the scope of application of the chart is increased, and the accurate use of the chart is ensured based on the actual formation conditions. In addition, in the present disclosure, the forward modeling results are combined with the actual formation conditions to make comprehensive determination and invasion correction of resistivity logging, improving the accuracy and speed of correction, making the resistivity value reflected by the corrected resistivity logging closer to the actual formation resistivity, and providing technical support for subsequent fluid identification in oil-gas reservoirs.

Taking Hangjin Banner block in Ordos Basin as an example, in the present disclosure, perforation intervals in original well data in a study work area have 123 layers, of which the initial interpretation of 95 layers is inconsistent with the conclusion of perforation interpretation, and after resistivity correction and analysis, intervals of the initial interpretation inconsistent with the conclusion of perforation interpretation are reduced to 19 layers. A gas layer is greatly affected by invasion, and a measured resistivity is smaller. After correction, the resistivity is mainly increased. A gas-water layer is mainly affected by the high resistance surrounding rock, leading to a larger measured resistivity, and a part of the intervals is affected by invasion, leading to a smaller measured resistivity, so the resistivity is increased or decreased after the correction, and a correction value for the gas-water layer is the largest. Most of a water layer is affected by high invasion, and a measured resistivity is larger, so the resistivity is mainly decreased after correction. A small part of the water layer is affected by low resistance surrounding rock and high salinity formation water, and a measured resistivity is smaller. Finally, the correlation between logging interpretation results after double lateral resistivity correction and actual perforation gas test results has been greatly improved, which lays a research foundation for the subsequent reservoir gas-bearing property evaluation, and can make a rough discrimination of reservoir fluid properties according to corrected RLLD and RLLS values.

Figure 10:
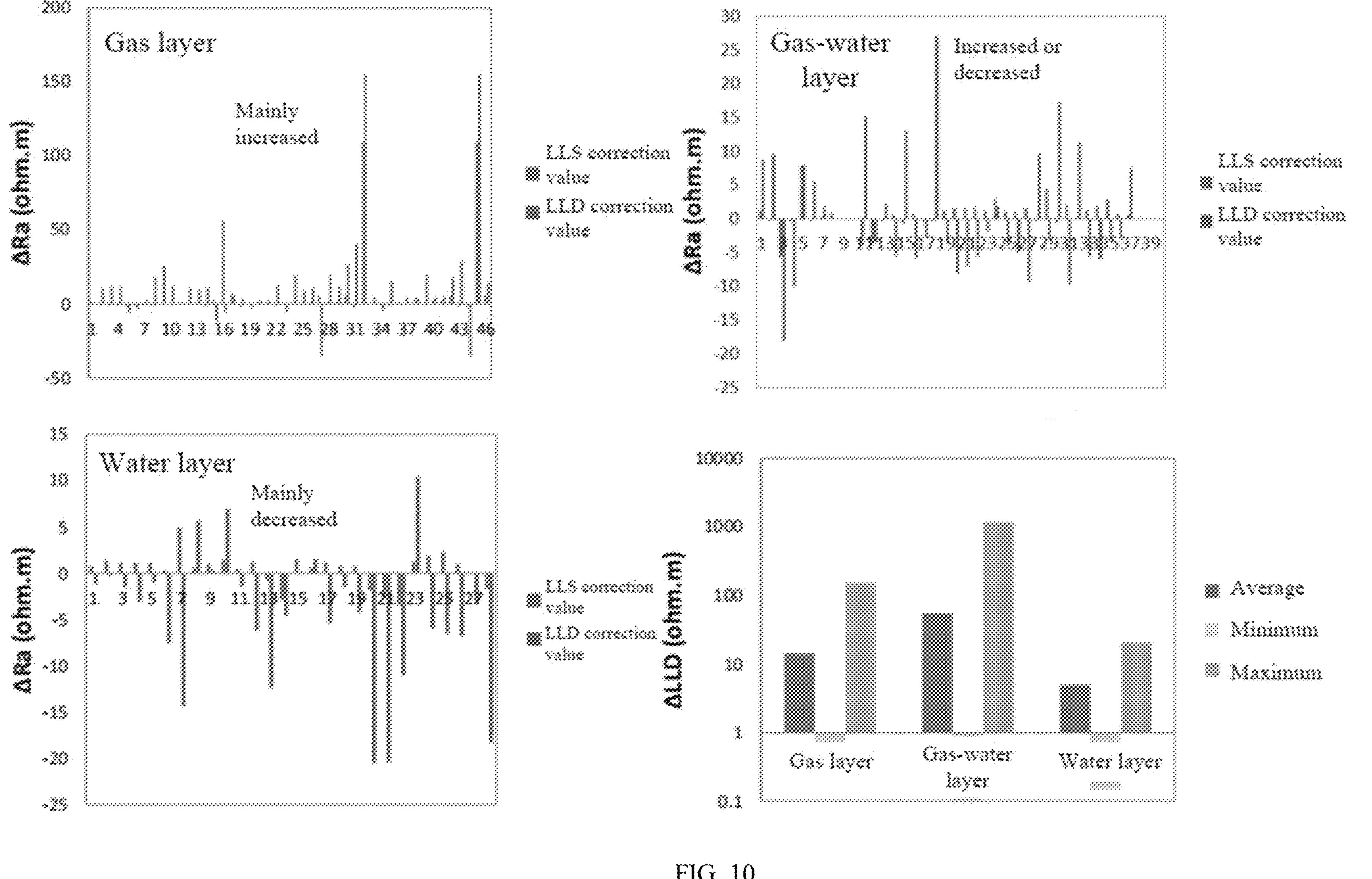
FIG. 10 is a statistical schematic diagram of different fluid types correction of original well data according to an example of the present disclosure.
Figure 11:
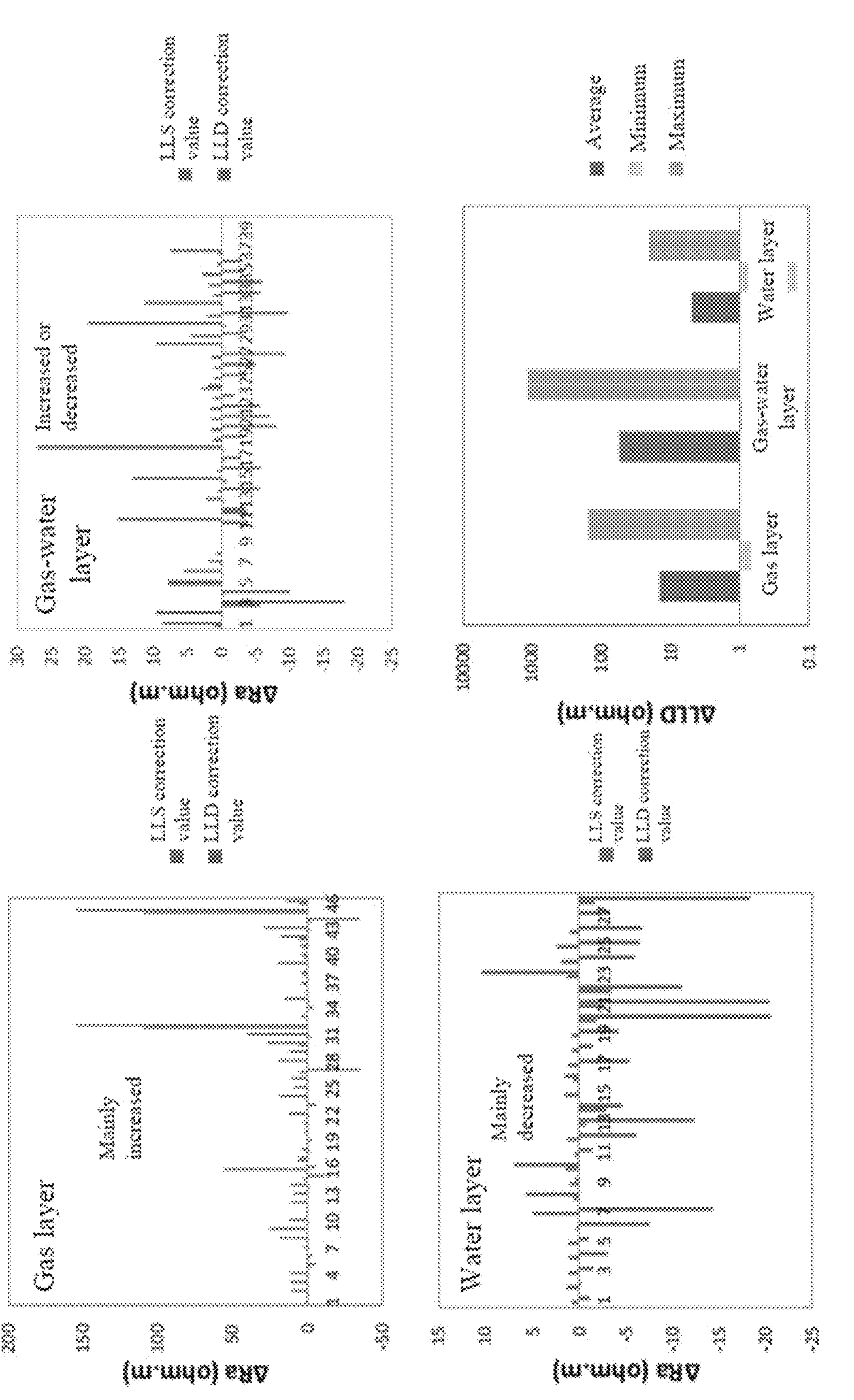
FIG. 11 is a statistical schematic diagram of different fluid types correction of original well data according to an example of the present disclosure.

As shown in FIG. 10, taking Hangjin Banner block in Ordos Basin as an example, in the present disclosure, perforation intervals in original well data in a study work area have 123 layers, of which the initial interpretation of 95 layers is inconsistent with the conclusion of perforation interpretation, and after resistivity correction and analysis, intervals of the initial interpretation inconsistent with the conclusion of perforation interpretation are reduced to 19 layers. A gas layer is greatly affected by invasion, and a measured resistivity is smaller. After correction, the resistivity is mainly increased. A gas-water layer is mainly affected by the high resistance surrounding rock, leading to a larger measured resistivity, and a part of the intervals is affected by invasion, leading to a smaller measured resistivity, so the resistivity is increased or decreased after the correction, and a correction value for the gas-water layer is the largest. Most of the water layer is affected by high invasion, and a measured resistivity is larger, so the resistivity is mainly decreased after correction. A small part of the water layer is affected by low resistance surrounding rock and high salinity formation water, and a measured resistivity is smaller. Finally, the correlation between logging interpretation results after double lateral resistivity correction and actual perforation gas test results has been greatly improved, which lays a research foundation for the subsequent reservoir gas-bearing property evaluation, and can make a rough discrimination of reservoir fluid properties according to corrected RLLD and RLLS values.

The following are six specific examples provided by the present disclosure, demonstrating applications of an invasion correction method for resistivity logging.

Example 1: during drilling, the real-time monitoring and correction were performed on logging resistivity data by using the method of the present disclosure, to improve the accuracy of formation evaluation during drilling. The specific implementation process includes the following steps. RLLS and RLLD data were collected in real time, invasion correction and parameter constraint were performed through the above method steps of S101 to S105, a formation resistivity value and an invasion depth after correction were outputted, and the formation evaluation during drilling was guided.

Example 2: during logging after completion of drilling, the invasion correction was performed on the existing logging resistivity data by using the method of the present disclosure. The specific implementation process includes the following steps. RLLS and RLLD data of the logging after completion of drilling were collected, invasion correction and parameter constraint were performed through the above method steps of S101 to S105, and a formation resistivity value and an invasion depth after correction were outputted, to provide more accurate data support for oil-gas reservoir evaluation.

Example 3: during oil-gas reservoir development, invasion correction was performed on historical logging resistivity data by using the method of the present disclosure. The specific implementation process includes the following steps. RLLS and RLLD data of historical logging were collected, invasion correction and parameter constraint were performed through the above method steps S101 to S105, and a formation resistivity value and an invasion depth after correction were outputted, to provide more accurate formation parameters for oil-gas reservoir development.

Example 4: during oil-gas reservoir exploration, invasion correction was performed on multi-well logging resistivity data by using the method of the present disclosure. The specific implementation process includes the following steps. RLLS and RLLD data of multiple wells were collected, invasion correction and parameter constraint were performed through the above method steps of S101 to S105, and a formation resistivity value and an invasion depth after correction were outputted, to provide more reliable geological information for oil-gas reservoir exploration projects.

Example 5: during unconventional oil-gas reservoir evaluation, invasion correction was performed on logging resistivity data by using the method of the present disclosure. The specific implementation process includes the following steps. RLLS and RLLD data of unconventional oil-gas reservoir logging were collected, invasion correction and parameter constraint were performed through the above method steps S101 to S105, and a formation resistivity value and an invasion depth after correction were outputted, to provide more accurate formation parameters for unconventional oil-gas reservoir evaluation.

Example 6: during training and education, students and engineers were taught how to perform invasion correction on logging resistivity data by using the method of the present disclosure. The specific implementation process includes the following steps. The basic principles and implementation steps of the method of the present disclosure were presented to the students and engineers to teach through practical cases how to collect the logging resistivity data, perform invasion correction and parameter constraint, and how to perform oil-gas reservoir evaluation based on a resistivity value and an invasion depth after correction.

It is to be noted that embodiments of the present disclosure may be implemented in hardware, software, or a combination of hardware and software. The hardware part may be implemented using special logic; and the software part may be stored in a memory and executed by a suitable instruction execution system, such as a microprocessor or special design hardware. It can be understood by those skilled in the art that the device and method described above may be implemented using computer-executable instructions and/or embodied in a processor control code, for example, provided on a carrier medium such as a disk, and a compact disc (CD) or digital video disc (DVD)-read-only memory (ROM), a programmable memory such as ROM (firmware), or a data carrier such as an optical or electronic signal carrier. The device of the present disclosure and its modules may be implemented by hardware circuits such as very large scale integrated circuits or gate arrays, semiconductors such as logic chips and transistors, or programmable hardware devices such as field programmable gate arrays and programmable logic devices, by software executed by various types of processors, or by a combination of the above hardware circuits and software, e.g. firmware.

The above is only the specific embodiments of the present disclosure, but the scope of protection of the present disclosure is not limited to this. Any modification, equivalent substitution and improvement made by any person familiar with the technical field within the technical scope disclosed by the present disclosure and within the spirit and principle of the present disclosure are to be included in the scope of protection of the present disclosure.

The invention claimed is:

1. An invasion correction system for resistivity logging, comprising:

a feature analysis module, configured to analyze mud filtrate invasion features based on an actual resistivity logging curve;

a resistivity forward modeling module, configured to determine an invasion mechanism, and perform forward modeling on a resistivity logging response;

a correction chart construction module, configured to perform inversion by a random forest method to form a correction chart, and calculate a correction coefficient to obtain an accurate corrected resistivity;

a parameter control module, configured to output a formation resistivity and perform parameter control under a complex borehole condition;

an instance verification module, configured to perform inspection on an actual gas test result; and an arbitrary borehole condition correction module, configured to perform parameter control, and control, when the difference between correction values of two adjacent points is less than an adaptive range, data errors of a diameter expansion point and upper and lower sampling points within the adaptive range, to increase an applicable range of the chart and perform arbitrary borehole condition correction.

* * * * *